No. 752,100. PATENTED FEB. 16, 1904.
C. E. POLLARD.
CLUTCH FOR POWER PRESSES.
APPLICATION FILED MAR. 7, 1902.
NO MODEL.
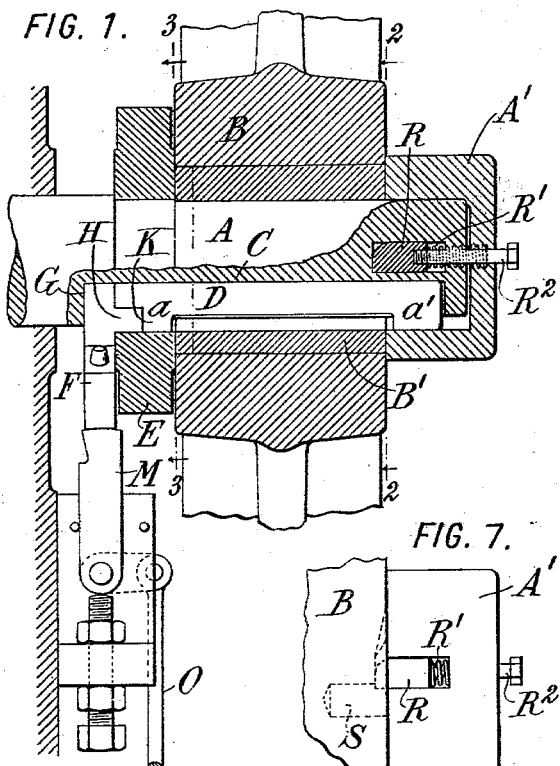
FIG. 1.
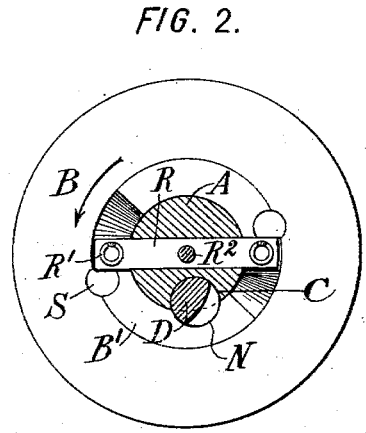
FIG. 2.
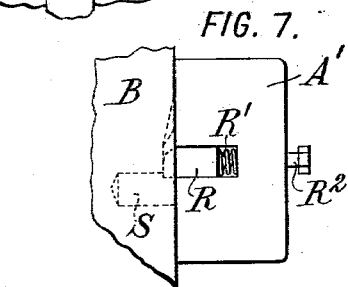
FIG. 7.
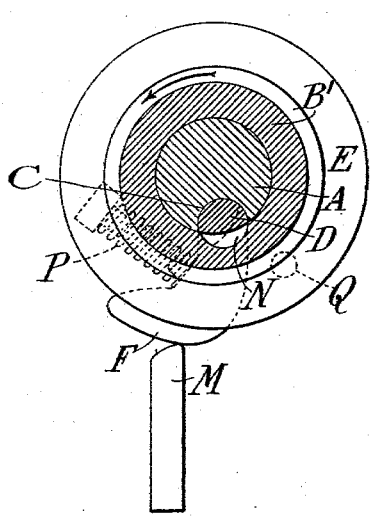
FIG. 3.
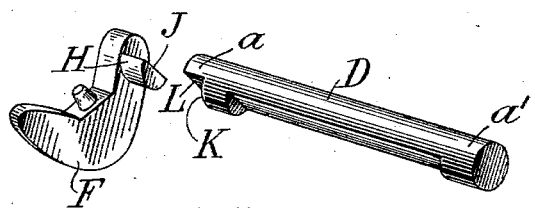
FIG. 4.
FIG. 5.
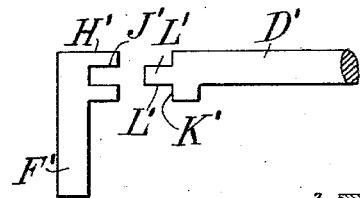
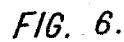
FIG. 6.
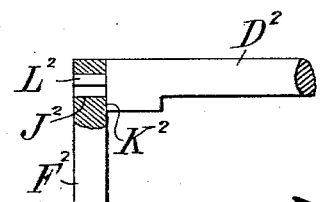
WITNESSES:
Rene' Pruine
Fred White
INVENTOR:
Charles E. Pollard,
By Attorneys,
Arthur C. Fraser & Co.

No. 752,100.

Patented February 16, 1904.

UNITED STATES PATENT OFFICE.

CHARLES E. POLLARD, OF BROOKLYN, NEW YORK, ASSIGNOR TO E. W. BLISS COMPANY, OF BROOKLYN, NEW YORK, A CORPORATION OF WEST VIRGINIA.

CLUTCH FOR POWER-PRESSES.

SPECIFICATION forming part of Letters Patent No. 752,100, dated February 16, 1904.

Application filed March 7, 1902. Serial No. 97,123. (No model.)

*To all whom it may concern:*

Be it known that I, CHARLES E. POLLARD, a citizen of the United States, residing in the borough of Brooklyn, county of Kings, city and State of New York, have invented certain new and useful Improvements in Clutches for Power-Presses, of which the following is a specification.

My invention aims to provide certain improvements in clutches for power-presses of the type in which an oscillating clutch-key is seated in one of the parts and is oscillated into or out of engagement with a recess in the other part, and aims especially to provide certain improvements in this type of clutch whereby the life of the clutch is increased by freeing it to a considerable extent from shocks which ordinarily occur and by making it better adapted to withstand such shocks without breakage or excessive wear.

My invention also provides various improvements in detail, as hereinafter explained.

The accompanying drawings illustrate a clutch in which my invention is embodied.

Figure 1 is a view, partly in side elevation and partly in section, showing the improvements which I have made. Fig. 2 is a section on the line 2 2 of Fig. 1. Fig. 3 is a section on the line 3 3 of Fig. 1. Fig. 4 is a perspective view of a clutch-key and operating-arm. Fig. 5 is a side view of another form of clutch-key and arm. Fig. 6 is a side view of a third form, the arm being shown in section. Fig. 7 is a fragmentary elevation of part of Fig. 1.

My invention is shown as applied to a shaft, which may be the main shaft of a power-press, and to the hub of a wheel, one of which parts is constantly rotating and is to be clutched to the other at desired intervals, being designed also to automatically disengage itself after each revolution unless the operator should throw the unclutching mechanism out of operation, so as to permit another revolution. Either the hub or the shaft may be the driving part and the other the driven part. The hub surrounds the shaft and is preferably, but not necessarily, journaled directly on the shaft. The clutch-key is seated in either of said parts, preferably the driven part, being shown in the embodiment illustrated as seated in the shaft, and an arm for turning the key projects outward therefrom and is adapted to be engaged with the unclutching mechanism at each revolution unless the latter is withdrawn, as explained. Clutches of this general type are in extensive use; but a great inconvenience and expense accompanies their use by reason of the frequent breaking of the clutch-key or the arm. These parts have been ordinarily formed of a single forging of hard steel, which is quite expensive. There is a considerable strain put on the edge of the key during the first portion of the clutching movement thereof, which tends to wear away the edge of the key and the edge of the recess in the hub. If the key is made of hard steel, so as to make these edges durable, it is also brittle, and there is frequent breakage of the arm or of the key where it joins the arm. If it is made of softer steel, so as to be less brittle and avoid breakage, then the edge soon wears away, and the key has to be replaced by a new one. There is also a very considerable shock in machines at present in use where a compound die, including a spring, is used, this shock being due to the fact that during the pressing movement of the crank or similar member of the machine a heavy spring is put under tension, so that the instant the crank passes the dead-center the spring throws it upward with an enormous force and turns the driven shaft ahead of the driving-hub, causing the key to move in the recess of the hub suddenly from the rear wall thereof against the front wall thereof. According to my invention I considerably reduce the number of breakages of such keys in a simple but remarkably effective manner—that is, by forming the body of the key separately from its arm. This construction at the same time is cheaper in first cost than the old construction and costs less for renewals, since even if the same number of breakages occurred as with an integral arm yet only a part of the complete member has to be renewed with my construction. Very little of the shock which comes upon the key is transmitted to the arm, most of it being taken up at the point of connection. The arm and the key preferably have at the joint coacting bearing-faces longitudinally of the key, by which the movement of the arm is transmitted to the key. Preferably, also, there is a slight play between these bearing-faces not sufficient to affect the operation and so slight as to be incapable of illustration, but sufficient to lessen the transmission of shock, so as to reduce the number of breakages to an inconsiderable quantity. The parts may, however, without sacrificing all the advantages of my invention be joined to each other, as by a solder or screw connection. A valuable feature of the construction is that I may make the key of hard steel, so as to be extremely durable, and may make the arm of softer metal, so as to be less brittle, but quite sufficiently strong for its purpose.

In order to prevent the excessive shocks occurring with compound dies, as above explained, I have invented also a device for holding back the shaft when it is clutched with the hub, so that it will be moved forward with the hub, but cannot move ahead of the hub. This device comprises a pawl on a shaft, which is pressed against a face of the hub, and a coacting ratchet-tooth on said face, the parts being so arranged that the pawl engages the ratchet-tooth to prevent forward movement of the shaft simultaneously with the engagement of the clutch.

Referring to the drawings, A indicates a shaft, and B a hub, arranged as described, a bushing B' being keyed to the latter. A recess C is provided in the shaft, in which is seated the oscillating clutch-key D, which has also complete bearings at its opposite ends or journals $a\,a'$. One of these bearings, as shown, is in a collar E on the shaft, the other bearing, as shown, being in a collar or cap A', keyed on the outer end of the shaft. The key D is provided with an arm F for oscillating it, the arm being separate from the key and being held against longitudinal separation by the end wall G of the recess in which the key is journaled and being held against lateral separation by the collar E. The improved arm and key are shaped, preferably, as shown in Fig. 4, in which the arm has a lateral projection H with a longitudinal bearing-face J, while the key has a recess K for receiving the projection H and has a similar bearing-face L. The actual shape of these parts may obviously be greatly varied without departing from the principle of operation. For example, in Fig. 5 the key D' has an angular recess K' on each side of a central member, upon which are longitudinal bearing-faces L', while the arm F' has a pair of projections H', which have longitudinal bearing-faces J', adapted to engage the bearing-faces L' of the key, or, as shown in Fig. 6, the key $D^2$ has an angular recess $K^2$, surrounding a central member, upon which are bearing-faces $L^2$, while the arm $F^2$ has longitudinal bearing-faces $J^2$, formed by a polygonal aperture in the arm. It is understood, as previously explained, that the bearing-shoulders J and L may be cut away, so as to allow a slight play between them during the operation of the clutch.

The operation will be understood from Fig. 3, in which the bushing B' is rotating in the direction of the arrow.

M is a stop which is normally in the path of the arm F as the shaft rotates and which normally throws the arm to the position indicated, so that the recess N is free from the key D. When, however, the stop M is turned out of the path of the arm by pressing a pedal connected with the rod O, Fig. 1, a spring P turns the key D into the recess N as the latter arrives at a point opposite the key, and the hub in its continued rotation carries the shaft with it. The key is shown as engaging the recess in Fig. 2.

Q is a stop limiting the forward movement of the arm F under the pressure of the spring P.

The parts P and Q are mounted on the inner face of the collar E in the usual manner.

For holding back the shaft, so that when the crank passes the dead-center the shaft shall not be turned forward relatively to the hub, I provide a pawl, which preferably consists of a rectangular bar R, extending through the outer end of the shaft adjacent to the outer face of the hub and projecting beyond the same at opposite ends. The pair of springs R' press the same forward, and a pin $R^2$ projects outward beyond the end of the shaft for manipulating the pawl from outside. In the face of the hub I provide a pair of coacting ratchet-teeth, having their abrupt shoulders formed, preferably, of pins S, of hardened steel. As the hub B is rotated the recess N comes opposite the key D in the shaft, and simultaneously the pawl R clicks over the abrupt face of the ratchet-tooth. If then the key D is turned to clutch the parts together, (see Fig. 2,) the shaft A is not only turned forwardly by the hub through the key D, but is held back from turning forward relatively to the hub by means of the pawl R pressing against the pin S.

Though I have described with great particularity of detail a clutch embodying my invention, yet it will be understood that the invention is not limited to the particular embodiment disclosed. Various modifications in the details and combinations of parts are possible to those skilled in the art without departure from the invention as defined in the following claims.

I do not in this application lay claim to my improved holding-back pawl in its broad application to any clutch, this being the subject-matter of a separate application, Serial No. 126,995, filed October 13, 1902.

What I claim is—

1. In a clutch, the combination with driving and driven parts comprising a shaft and a hub surrounding the same, of an oscillating clutch-key seated in one of said parts, and an arm in engagement with said key for turning the same to clutch or unclutch said parts, said arm being formed separately from said key.

2. In a clutch, the combination with driving and driven parts comprising a shaft and a hub surrounding the same, of an oscillating clutch-key seated in one of said parts, and an arm for turning said key to clutch or unclutch said parts, said arm being formed separately from said key and said arm and key having coacting longitudinal bearing-faces.

3. In a clutch, the combination with driving and driven parts comprising a shaft and a hub surrounding the same, of an oscillating clutch-key seated in one of said parts, and an arm for turning said key to clutch or unclutch said parts, said arm being formed separately from said key and said arm and key having coacting longitudinal bearing-faces bearing against each other with a slight play so as to lessen the transmission of shock from one part to the other.

4. In a clutch, the combination with driving and driven parts comprising a shaft and a hub surrounding the same, of an oscillating clutch-key seated in one of said parts, and an arm in engagement with said key for turning the same to clutch or unclutch said parts, said key being of hard metal and said arm being formed separate from said key and of softer metal.

5. In a clutch, the combination with a shaft of a hub surrounding the same, said shaft having a recess, an oscillating clutch-key seated in said recess, an arm in engagement with said key for turning the same to clutch or unclutch said hub and shaft, said arm being separate from said key and held against longitudinal separation by the end wall of said recess, and a collar on said shaft holding said arm against lateral separation.

6. In a clutch, the combination with a shaft of a hub surrounding the same, an oscillating clutch-key seated in said shaft and an arm for turning said key to clutch or unclutch said hub and shaft, said arm being separate from said key and having a projection H with a longitudinal bearing-face J, and said key having a recess K and a similar bearing-face L.

7. The combination with a shaft, of a hub surrounding the same, an oscillating key seated in said shaft, means for turning said key to clutch or unclutch said shaft and hub whereby one may be driven by the other, a pawl passing through said shaft and extending outward thereof at both ends, means for pressing the same against a face of said hub, and coacting ratchet-teeth on said face, said pawl being arranged to act simultaneously with said clutch to hold back the driven part and prevent its moving forward relatively to the driving part.

In witness whereof I have hereunto signed my name in the presence of two subscribing witnesses.

CHARLES E. POLLARD.

Witnesses:
OTTO S. BEYER,
C. J. ELLSWORTH.